US006939647B1

(12) United States Patent
Jow et al.

(10) Patent No.: US 6,939,647 B1
(45) Date of Patent: Sep. 6, 2005

(54) NON-AQUEOUS ELECTROLYTE SOLUTIONS AND NON-AQUEOUS ELECTROLYTE CELLS COMPRISING THE SAME

(75) Inventors: T. Richard Jow, Potomac, MD (US); Shengshui Zhang, Olney, MD (US); Kang Xu, North Potomac, MD (US); Michael S. Ding, Gaithersburg, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 325 days.

(21) Appl. No.: 10/060,139

(22) Filed: Feb. 1, 2002

Related U.S. Application Data

(60) Provisional application No. 60/267,895, filed on Feb. 13, 2001, provisional application No. 60/268,516, filed on Feb. 13, 2001, and provisional application No. 60/269,478, filed on Feb. 20, 2001.

(51) Int. Cl.[7] .................................... H01M 10/40

(52) U.S. Cl. ..................... 429/341; 429/326; 429/330; 429/200

(58) Field of Search ............................ 429/324–346, 429/199, 200

(56) References Cited

U.S. PATENT DOCUMENTS

| | | | | |
|---|---|---|---|---|
| 3,769,092 A | * 10/1973 | Dechenaux | 429/335 |
| 5,474,862 A | 12/1995 | Okuno et al. | 429/197 |
| 5,580,684 A | 12/1996 | Yokoyama et al. | 429/194 |
| 5,830,600 A | 11/1998 | Narang et al. | 429/192 |
| 5,869,208 A | * 2/1999 | Miyasaka | 429/332 X |
| 5,916,708 A | 6/1999 | Besenhard et al. | 429/199 |

(Continued)

FOREIGN PATENT DOCUMENTS

| | | | | |
|---|---|---|---|---|
| JP | 10-247517 | * 9/1998 | H01M/10/40 |
| WO | WO00/33410 | * 6/2002 | H01M/10/40 |

OTHER PUBLICATIONS

"Low Temperature Electrolyte for Lithium and Lithium–Ion Batteries," Edward J. Plichta, Wishvender K. Behl, (Jun. 1998).

(Continued)

*Primary Examiner*—Stephen J. Kalafut
(74) *Attorney, Agent, or Firm*—William V. Adams

(57) ABSTRACT

Non-aqueous electrolyte solutions capable of protecting lithium metal and lithium-inserted carbonaceous electrodes include an electrolyte salt, preferably $LiPF_6$, and a non-aqueous electrolyte solvent mixture comprising at least one of trialkyl phosphites, one or more cyclic or/and linear carbonates, and optionally other additives, such as, gelling agents, ionically conductive solid polymers, and other additives. The trialkyl phosphites have the following general formula:

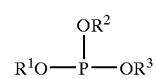

wherein the oxidation number of the phosphorus atom is III (three), $R^1$, $R^2$, and $R^3$ are the same or different, independently selected from linear or branched alkyl groups having 1 to 4 carbon atoms, optionally but not limited to, with one or more of the alkyl substituents being substituted by one or more halogen atoms, preferably fluorine atoms.

24 Claims, 10 Drawing Sheets

U.S. PATENT DOCUMENTS

| | | | | | |
|---|---|---|---|---|---|
| 6,010,806 | A | | 1/2000 | Yokoyama et al. | 429/330 |
| 6,048,637 | A | * | 4/2000 | Tsukahara et al. | 429/332 X |
| 6,068,950 | A | | 5/2000 | Gan et al. | 429/231.9 |
| 6,475,679 | B1 | * | 11/2002 | Tsutiya et al. | 429/339 |
| 2002/0009644 | A1 | * | 1/2002 | Yoshimura et al. | 429/332 X |
| 2002/0076619 | A1 | * | 6/2002 | Yamada et al. | 429/324 |

OTHER PUBLICATIONS

"Relationships between Electrolyte and Graphite Electrode in Lithium Ion Batteries," Hizuru Koshina, Hajime Nishino, Kaoru Inoue, Akiyoshi Morita, Akira Ohta, (Jan. 1998).

"Liquid–Solid Phase Diagrams of Binary Carbonates for Lithium Batteries," Journal of The Electrochemical Society, 147 (5) 1688–1694 (2000), (month unknown).

"Development of High conductivity Lithium–ion Electrolytes for Low Temperature Cell Applications," M.C. Smart, V.V. Ratnakumar, S. Surampudi Proceedings of the $38^{th}$ Power Sources Conference, Cherry Hill, NJ, Jun. 8–11, 1998.

"Effect of Carbon Coating on Electrochemical Performance of Treated Natural Graphite as Lithium–Ion Battery Anode Material," Masaki Yoshio, Hongyu Wang, Kenji Fukuda, Yoichiro Hara and Yoshio Adachi Journal of The Electrochemical Society; 147 (4) 1245–1250 (2000), (month unknown).

* cited by examiner

NON-AQUEOUS ELECTROLYTE SOLUTIONS AND NON-AQUEOUS ELECTROLYTE CELLS COMPRISING THE SAME

CROSS-REFERENCE TO RELATED APPLICATION

This application claims the benefit of U.S. Provisional Application No. 60/267,895, filed Feb. 13, 2001; and both U.S. Provisional Application No. 60/268,516 filed Feb. 13, 2001, and U.S. Provisional Application No. 60/269,478, filed Feb. 20, 2001; each of which is incorporated by reference in its entirety.

GOVERNMENT INTEREST

The invention described herein may be manufactured, used and/or licensed by or for the United States Government.

BACKGROUND OF THE INVENTION

1. Field of the Invention

The present invention relates to non-aqueous electrolyte solutions for electrochemical energy storage devices such as high energy density batteries and high power capacitors.

2. Discussion of the Prior Art

High voltage and high energy density rechargeable batteries based on non-aqueous electrolyte solutions are widely used as electric sources for various kinds of consumer electronic appliances, such as camcorders, notebook computers, and cell phones, because of their high voltage and high energy density as well as their reliability such as storage characteristics. This type of battery employs complexed oxides of lithium and a transition metal as positive electrode, such as $LiCoO_2$, $LiNiO_2$, $LiMn_2O_4$, and variations of the previous oxides with different dopants and different stoichiometry, and additionally utilizes lithium metal, lithium alloys, and carbonaceous materials as a negative electrode. Chosen over the lithium metal and lithium alloys are carbonaceous negative electrode materials, which are in general partially or fully graphitized and specially modified natural graphites. This type of battery, which uses a carbonaceous negative electrode, is also called lithium-ion (Li-ion) battery because no pure lithium metal is present in the negative electrode. During charge and discharge processes, the lithium ions are intercalated into and de-intercalated from the carbonaceous negative electrode, respectively. A significant advantage of such negative electrodes is that the problem of dendrite growth is eliminated, which is often observed in a negative electrodes of lithium metal or its alloy, and additionally prevents circuit-shorting of the cells.

Non-aqueous electrolyte solutions used in the-state-of-the-art lithium-ion batteries conventionally include a cyclic carbonate, such as ethylene carbonate (EC) or propylene carbonate (PC); and a linear carbonate, such as dimethyl carbonate (DMC), diethyl carbonate (DEC), and ethylmethyl carbonate (EMC), and an electrolyte salt such as lithium hexafluorophosphate ($LiPF_6$), lithium imide ($LiN(SO_3CF_3)_2$), lithium trifluorosulfonate ($LiCF_3SO_3$), lithium hexafluoroarsenate ($LiAsF_6$), and lithium tetrafluoroborate ($LiBF_4$). The cyclic carbonates are chemically and physically stable and have high dielectric constant, which are necessary for their ability to dissolve salts. The linear carbonates are also chemically and physically stable and have low dielectric constant and low viscosity, which is required to increase the mobility of the lithium ions in the electrolytes. However, linear carbonates generally have a low boiling point and high volatility, and the cells incorporating linear carbonates can easily build up internal pressure at elevated temperatures, thereby raising safety concerns. Moreover, these linear carbonates are also highly flammable, rendering the lithium and lithium ion cells containing these components safety hazard when abused or under extreme working conditions.

As disclosed in U.S. Pat. No. 5,580,684 to Yokoyama et al. and U.S. Pat. No. 5,830,600 to Narang et al. (both of which are hereby incorporated by reference in their entirety), phosphoric acid esters of phosphorous valence V such as trimethyl phosphate and triethyl phosphate were proposed to reduce flammability of electrolyte solutions and thus to improve the safety of cells containing flammable solvents such as carbonate based solvents. However, the electrolyte solutions disclosed therein reduce flammability due to the self-extinguishing characteristic of the electrolyte. Therefore, once the electrolyte ignites, the flames are quickly eliminated as the electrolyte “burns out”.

PC-based electrolytes are those electrolyte solutions containing any PC solvent and an EC-based electrolyte for those comprising EC solvent as the only cyclic carbonate. Compared to EC, PC solvent is more oxidatively stable and has wider liquid temperature ranges. However, PC is not generally used as a solvent component in rechargeable lithium-ion batteries employing graphitic carbonaceous negative materials. This is due to the co-intercalation of PC with lithium ions into graphene layers of the graphitic carbonaceous negative materials and the further decomposition of PC between the layers or/and on the surface of the graphite. This reaction yields gases, causes exfoliation of graphitic carbonaceous negative electrode, and finally reduces the performance of lithium-ion batteries. This problem of PC decomposition must be resolved before the lithium-ion batteries can take the advantages of PC.

In terms of cost and performance, graphite is most often used as the negative electrode material for Li-ion batteries. Therefore, it is desirable to combine a graphite negative electrode and a PC-based electrolyte into a Li-ion battery, which performs in a wider temperature range and at high voltages. Coating of a protective layer onto the surface of graphite particles to prevent the co-intercalation and decomposition of PC solvents was proposed by Yoshio et al. (see J. Electrochem. Soc., 147 (4), 1245 (2000)), herein incorporated by reference in its entirety.

No matter what solvents are used for the electrolyte of Li-ion batteries, protective SEI films are formed to protect the graphite negative electrode from solvent co-intercalation and exfoliation. It has been known that the charge-discharge performance of Li-ion batteries significantly depends on the properties of these SEI films, which are closely related to the: property of the solvent. These SEI films become very resistive at temperatures below −20° C. and consequently lose the ability to protect the electrode at temperatures above 50° C. (see for example Plictha et al., “Low Temperature Electrolyte for Lithium and Lithium-Ion Batteries”, Proc. 38th Power Sources Conf., 8–11, June 1998, Cherry Hill, N.J., hereby incorporated by reference in its entirety). Therefore, it is desirable to improve electrolyte solutions for Li-ion batteries using graphite negative electrode even if those contain no PC solvent.

SUMMARY OF THE INVENTION

In this invention, electrolyte solutions are prepared by dissolving one or more lithium salts into a solvent mixture containing at least 2–50% by weight of trialkyl phosphites, one or more cyclic carbonate, such as PC and EC, and/or one or more linear carbonates, such as DMC, DEC, and EMC.

It has been shown with conventional non-aqueous electrolyte solutions that the graphite negative electrodes of Li-ion batteries are incompatible with PC-based electrolytes. After incorporating the trialkyl phosphites, into the electrolyte solutions as described herein, PC decomposition and graphite exfoliation are both suppressed and the Li-ion batteries can withstand high voltage, achieve high discharge capacity, maintain high discharge/charge efficiency, and retain high discharge capacity in long term usage. This indicates that the trialkyl phosphites of this invention are effective in preventing the reaction between PC and graphite.

Li-ion cells using a graphite negative electrode can perform with success in an EC-based electrolyte. However, the performance can be further improved when trialkyl phosphite is added to the electrolyte. This suggests that the trialkyl phosphites of this invention can further protect the graphite negative electrode in an EC-based electrolyte.

Still another advantage of trialkyl phosphite is that the electrolyte solutions containing it are non-flammable because the alkyl phosphite itself is a flame retardant.

Additional objects, features and advantages of the present invention will become more fully apparent from the following detailed description of preferred embodiments, when taken in conjunction with the drawings wherein like reference numerals refer to corresponding parts in the several views.

DETAILED DESCRIPTION OF THE PREFERRED EMBODIMENTS

Figure 1:
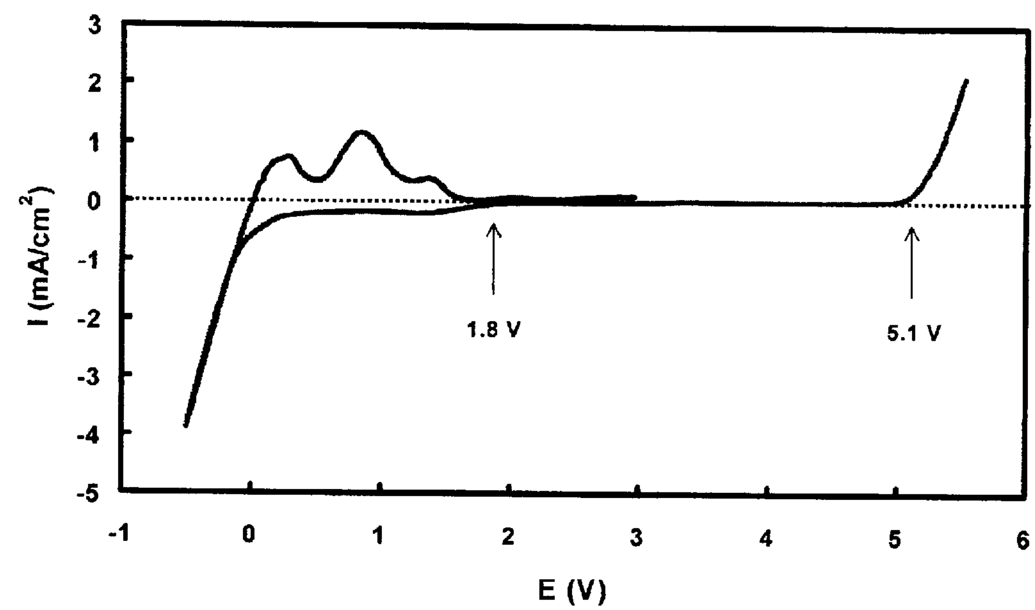
FIG. 1 is a cyclic voltammogram of platinum (Pt) electrode in 1 m $LiPF_6$/PC-TTFP (1:1 weight ratio) electrolyte.

The present invention can be obtained by the use of the non-aqueous electrolyte comprising alkyl phosphite represented by the formula:

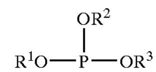

wherein the oxidation number of the phosphorus atom is III (three), $R^1$, $R^2$, and $R^3$ are the same or different, independently selected from linear or branched alkyl groups having 1 to 4 carbon atoms, optionally but not limited to, with one or more of the alkyl substituents being substituted by one or more halogen atoms, preferably fluorine atoms. Examples of the alkyl groups include methyl, ethyl, n-propyl, isopropyl, n-butyl, sec-butyl, t-butyl, iso-butyl groups and the like. Examples of alkyl groups substituted with halogen atom(s) include alkyl groups substituted with fluorine atom(s), alkyl groups substituted with chlorine atom(s), and alkyl groups substituted with bromine atom(s), and one alkyl group substituted with halogen atoms may have fluorine, chlorine and bromine atoms simultaneously. Examples of the alkyl group substituted with fluorine atom(s) include difluoromethyl $CF_2H$, monofluoromethyl $CFH_2$, trifluoromethyl $CF_3$, 2,2-difluoroethyl $CF_2HCH_2$, 2-fluoroethyl $CFH_2CH_2$, 2,2,2-trifluoroethyl $CF_3CH_2$, 3,3,2,2-tetrafluoropropyl $CF_2HCF_2CH_2$, 3,2,2-trifluoropropyl $CFH_2CF_2CH_2$, and 3,3,3,2,2-pentafluoropropyl $CF_3CF_2CH_2$, 1,1,3,3-tetrafluoro-2-propyl $(CF_2H)_2CH$, 1,1,1,3,3,3-hexafluoro-2-propyl $(CF_3)_2CH$, 2,2,3,3,4,4,4-heptafluorobutyl $CF_3CF_2CF_2CH_2$, and perfluoro-t-butyl $(CF_3)_3C$ groups.

Examples of fluoroalkyl phosphite according to the present invention include, but are not limited to, for example, tris(2,2,2-trifluoroethyl) phosphite (TTFP), bis(2,2,2-trifluoroethyl)methyl phosphite, 2,2,2-trifluoroethyldimethyl phosphite, tris(monofluoromethyl) phosphite, tris(2,2-difluoroethyl) phosphite, tris(3,2,2-trifluoropropyl) phosphite. Preferably, however, the fluoroalkyl phosphite is TTFP.

When used in high voltage cells, the alkyl phosphite compounds may be substituted with halogen atom(s) and/or may be mixed with one or more cyclic carbonates. To reduce the viscosity and to increase the ionic conductivity of the electrolyte solution, the alkyl phosphite compounds substituted with one or more halogen atom can additionally be mixed with one or more cyclic carbonates and/or one or more linear carbonates.

The solvents to be mixed with the above-described alkyl phosphite compounds substituted with halogen atom(s) may be one or more of conventionally used solvents, for example, cyclic carbonates, such as ethylene carbonate and propylene carbonate; and/or linear carbonates, such as diethyl carbonate, dimethyl carbonate, and ethylmethyl carbonate.

Examples of cyclic carbonates suitable for use in the present invention include propylene carbonate, ethylene carbonate, butylene carbonate, vinylene carbonate. Examples of linear carbonates suitable for use with the present invention include dimethyl carbonate, diethyl carbonate, ethylmethyl carbonate, methylpropyl carbonate, methylisopropyl carbonate, methylbutyl carbonate, and ethylbutyl carbonate.

The cyclic carbonates can be used at any concentration, but are preferably used from 10 to 90% by weight of the solvents contained in the electrolyte solutions. The linear carbonates can be used at a concentration of 10 to 90% by weight of the solvents contained in the electrolyte solutions. It is preferred that the both of the cyclic carbonates and the linear carbonates are mixed with the alkyl phosphate compounds substituted with the more or more halogen atoms for optimum conductivity at wider temperature ranges.

The solutes contained in the electrolyte solutions of the present invention may be any lithium salt, preferably $LiPF_6$, $LiBF_4$, $LiAsF_6$, $LiClO_4$, $LiCF_3SO_3$, $LiN(CF_3SO_2)_2$, and $LiAlCl_4$. $LiPF_6$ is more preferred.

The concentration of the solute in the electrolyte solution may be any concentration, but a concentration of 0.1 to 3 mol/liter is preferred. A concentration of 0.5 to 2 mol/liter is more preferred.

The non-aqueous electrolyte cells of the present invention utilize the non-aqueous electrolyte solutions having a composition explained above and comprise at least a negative electrode, positive electrode, and separator. Such cells are described in detail in U.S. Provisional Application No. 60/267,895, filed Feb. 13, 2001, herein incorporated by reference in its entirety.

As the negative electrode material, lithium metal, lithium alloys and carbonaceous materials capable of being intercalated and de-intercalated with lithium ions can be used, while carbonaceous materials capable of being intercalated and de-intercalated with lithium ions are preferred. Such carbonaceous materials may be graphite or amorphous carbon, and carbon materials, such as activated carbon, carbon fibers, carbon black, and mesocarbon microbeads.

As the positive electrode material, transition metal oxides such as $MnO_2$ and $V_2O_5$, transition metal sulfides, such as $MoS_2$ and $TiS_2$; conducting polymers, such as polyaniline and polypyrrole; compounds capable of being reversibly polymerized and de-polymerized by electrolysis, such as disulfide compounds, complexed oxides of lithium; and transition metals, such as $LiCoO_2$, $LiMnO_2$, $LiMn_2O_4$, and $LiNiO_2$ and the like can be used. However, the complexed oxides of lithium and transition metals are preferred.

The non-aqueous electrolyte cells of the present invention comprise the non-aqueous electrolyte solutions explained above as electrolyte solutions. The cells may also be non-aqueous electrolyte secondary (or rechargeable) cells of practical use. By using the electrolyte solutions of the present invention the cells are capable of withstanding high voltage, achieving high discharge capacity, maintaining high discharge/charge efficiency, and retaining high discharge capacity after many repeated charge/discharge cycles. Furthermore, by using the electrolyte solutions of the present invention the cells have the added advantage of retarding flame because the alkyl phosphite compounds substituted with one or more halogen atom are also flame retardants. The cells of the present invention, in contrast to conventional cells, reduce flammability by incorporating materials which do not ignite, and therefore no "burn out" is required before eliminating flames.

The shape of the non-aqueous electrolyte cells of the present invention is not particularly limited and they may have a shape selected within the scope of the present invention such as cylindrical shape, rectangular shape, coin-like shape, card-like shape, large size shape and the like.

The present invention will be illustrated by referring to the following non-limiting examples hereinafter.

EXAMPLE 1

Stability of TTFP with Respect to Platinum (Pt) Electrode

The stability of TTFP with respect to a Pt electrode was evaluated using a cyclic voltammetry technique at a potential scan rate of 5 mV/s. The working electrode was a Pt foil with an area of 8×8 mm. Both the counter and reference electrodes were lithium metal. The electrolyte used was a 1 m $LiPF_6$/PC-TTFP (1:1 weight ratio) solution. The voltammogram as shown in FIG. 1 indicates that with respect to Pt, the TTFP is stable up to 5.1 V in the oxidative side and starts a reductive reaction at about 1.8 V. This figure also indicates that current density of the reductive reaction is depressed at a level of 0.7 $mA/cm^2$, until metal lithium starts to deposit at much lower potential.

EXAMPLE 2

Figure 2:
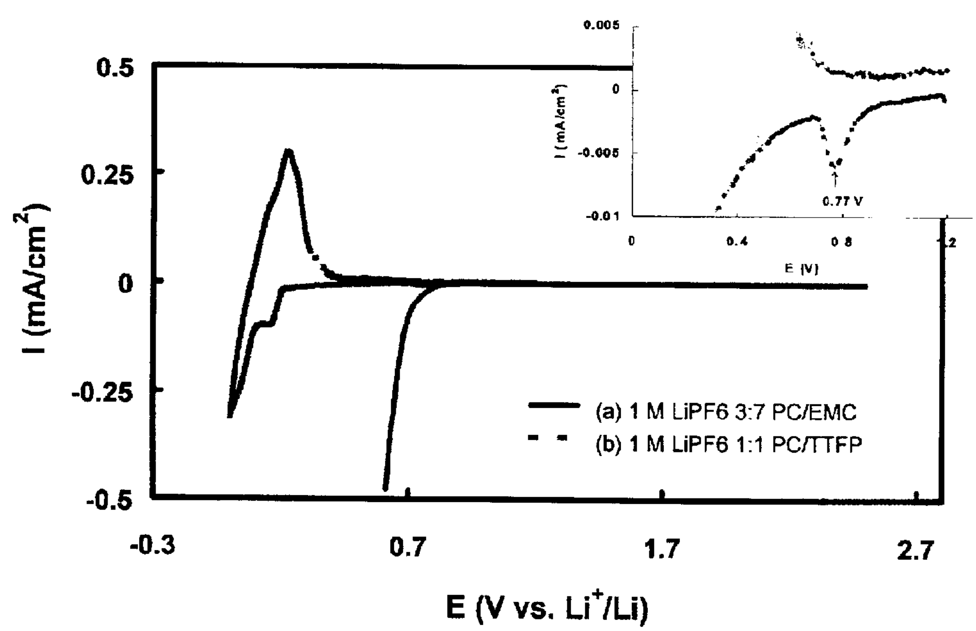
FIG. 2 shows cyclic voltammograms of a graphite electrode in $LiPF_6$/PC-EMC (3:7 weight ratio) and in 1 m $LiPF_6$/PC-TTFP (1:1) for the first cycle.

Stability of 1 m $LiPF_6$/PC-EMC (3:7 wt Ratio) Electrolyte and 1 m $LiPF_6$/PC-TTFP (1:1 wt Ratio) Electrolyte with Respect to Graphite Electrode Two identical Li/graphite cells with an electrode area of 6 $cm^2$ were assembled. The first cell was filled with 1 m $LiPF_6$/PC-EMC (3:7 wt ratio) electrolyte, and the second cell was filled with 1 m $LiPF_6$/PC-TTFP (1:1 wt ratio) electrolyte. The stability of the electrolyte was tested using a cyclic voltammetry technique at a scanning rate of 0.01 mV/s between 2.5 V and 0 V. Cyclic voltammogram of the first cell is shown as curve (a) in FIG. 2. When the potential was scanned down to 0.8 V vs. $Li^+/Li$, a sharp increase in the cathodic current was found. The experiment was terminated at around 0.6 V because of too large current. A cyclic voltammogram of the second cell is shown as curve (b) in FIG. 2. The sharp increase in the cathodic current only started at below 0.2 V, and finally formed a pair of redox current peaks with an coulomb efficiency of 90%. Inset of FIG. 2 shows a small current peak near 0.8 V during the first intercalation of Li ions into the graphite electrode. This small current peak indicates the formation of a SEI film on the graphite electrode because it irreversibly vanished in the subsequent cycles.

EXAMPLE 3

Figure 3:
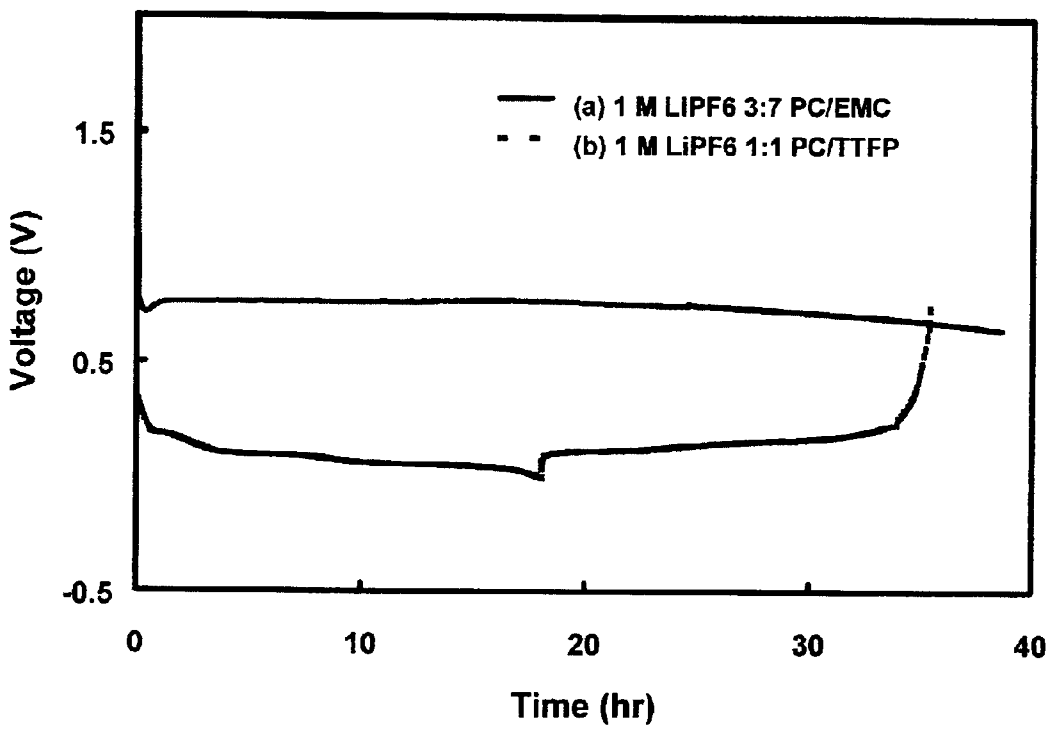
FIG. 3 is the voltage profile of a graphite electrode (relative to a Li electrode) in 1 m $LiPF_6$/PC-EMC (3:7 weight ratio) and $LiPF_6$/PC-TTFP (1:1) electrolytes for the first discharge and charge cycle.

Discharge of Graphite Electrode in 1 m $LiPF_6$/PC-EMC (3:7 wt Ratio) Electrolyte and in 1 m $LiPF_6$/PC-TTFP (1:1 wt Ratio) Electrolyte Two identical Li/graphite cells were assembled in the same manner as described in Example 2. The first cell was filled with 1 M $LiPF_6$/PC-EMC (3:7 wt ratio) electrolyte and the second cell was filled with 1 M $LiPF_6$/PC-TTFP (1:1 wt ratio) electrolyte. Both cells were discharged from open-circuit voltage (OCV) at a constant current density of 0.093 $mA/cm^2$. The voltage of the first cell, as shown in curve (a) in FIG. 3, was shortly decreased to 0.8 V from OCV and indefinitely retained at around 0.8 V. The voltage of the second cell was able to discharge to 0.002 V and then charged back to 1.0 V at the same 0.093 $mA/cm^2$. Curve (b) of FIG. 3 indicates a coulomb efficiency of 88% for the first intercalation and de-intercalation of Li ions into the graphite electrode. This example demonstrates that the addition of TTFP into PC could prevent the decomposition of the PC on graphite electrode and allow the Li ions to intercalate into and de-intercalate out of the graphite electrode.

EXAMPLE 4

Figure 4:
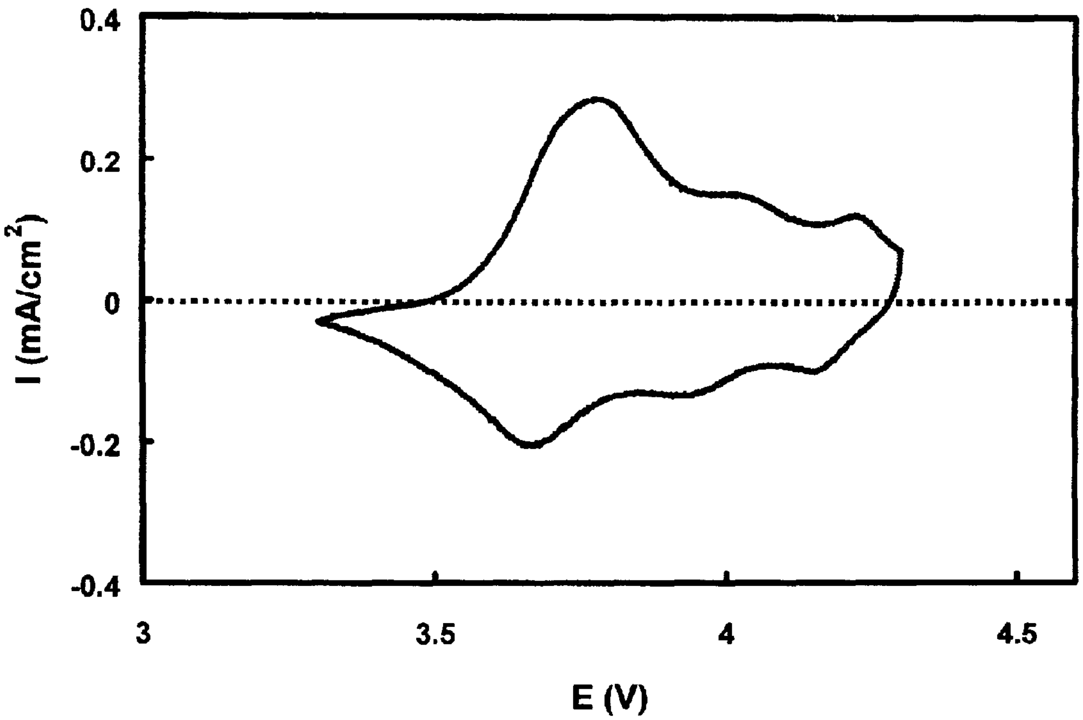
FIG. 4 is a cyclic voltammogramm of $Li_xNi_{0.8}Co_{0.2}O_2$ cathode in 1 m $LiPF_6$/PC-TTFP (1:1 wt ratio) electrolyte.

Stability of 1 m $LiPF_6$/PC-TTFP (1:1 wt Ratio) Electrolyte with Respect to $Li_xNi_{0.8}Co_{0.2}O_2$ Cathode A $Li/Li_xNi_{0.8}Co_{0.2}O_2$ cell with an electrode area of 6 $cm^2$ was assembled and filled with 1 m $LiPF_6$/PC-TTFP (1:1 wt ratio) electrolyte. The stability of the electrolyte with respect to the $Li_xNi_{0.8}Co_{0.2}O_2$ cathode was tested using a cyclic voltammetry technique at a scanning rate of 0.02 mV/s between 3.3V and 4.3 V. The cyclic voltammogram of this cell is shown in FIG. 4, indicating that Li/$Li_xNi_{0.8}$Co0.2$O_2$ cell has a coulombic efficiency of 95%. No sharp increase in the oxidative current over the tested voltage range indicates that TTFP is stable with respect to the $Li_xNi_{0.8}Co_{0.2}O_2$ cathode and is also suitable as an electrolyte solution for $Li_xNi_{0.8}Co_{0.2}O_2$ cathode.

EXAMPLE 5

Figure 5:
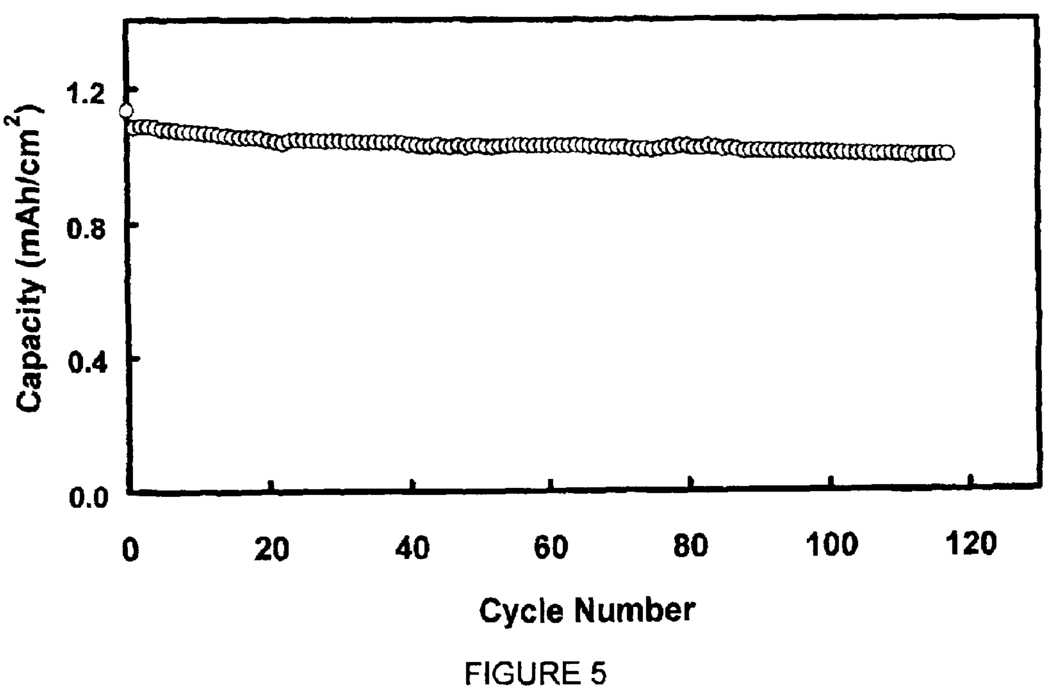
FIG. 5 shows the discharge capacity of graphite/$Li_xNi_{0.8}Co_{0.2}O_2$ cell versus cycle number using 1 m $LiPF_6$/PC-TTFP (1:1 wt ratio) electrolyte.

Cycling Performance of Graphite/$Li_xNi_{0.8}Co_{0.2}O_2$ Cell Using 1 m $LiPF_6$/PC-TTFP (1:1 wt Ratio) Electrolyte at a Constant Current Density A graphite/$Li_xNi_{0.8}Co_{0.2}O_2$ button cell with an electrode area of 1.27 $cm^2$ was assembled and filled with 1 m $LiPF_6$/PC-TTFP (1:1 wt ratio) electrolyte. The separator between negative and positive electrodes was a Celgard membrane. The cell was first charged and discharged at a current density of 0.1 $mA/cm^2$, and then cycled at a constant current density of 0.3 $mA/cm^2$ between 2.5 V and 3.9 V. Discharge capacity of the cell versus cycle number is shown in FIG. 5.

EXAMPLE 6

Figure 6:
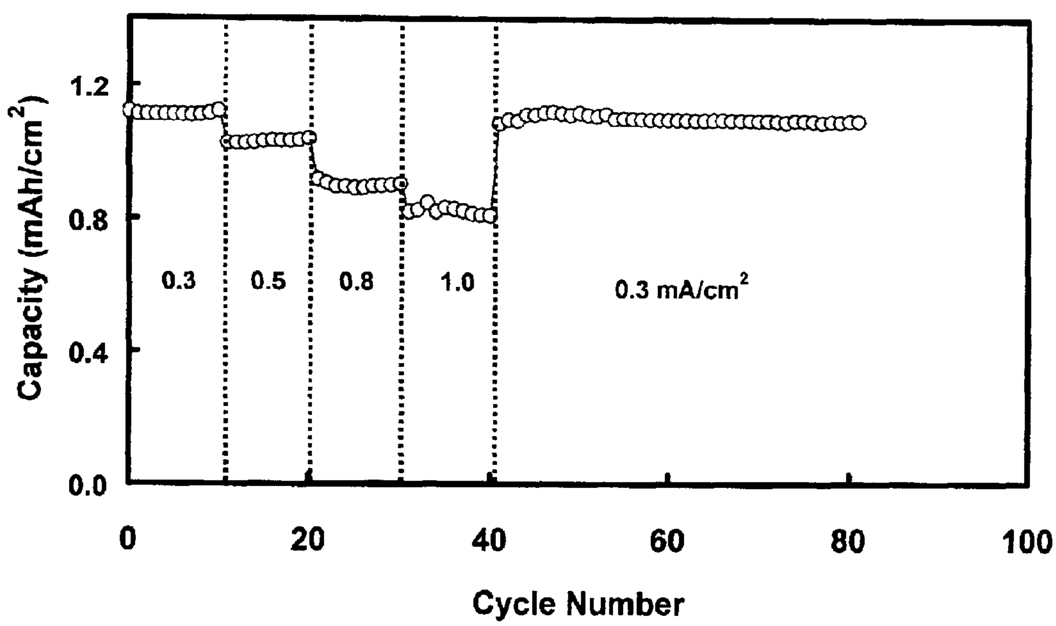
FIG. 6 demonstrates discharge capacity versus cycle for graphite/$Li_xNi_{0.8}$Co0.2$O_2$ cell at current densities of 0.3, 0.5, 0.8, 1.0 $mA/cm^2$ using 1 m $LiPF_6$/PC-TTFP (1:1 wt ratio) electrolyte.

Cycling Performance of Graphite/$Li_xNi_{0.8}Co_{0.2}O_2$ Cell Using 1 m $LiPF_6$/PC-TTFP (1:1 wt Ratio) Electrolyte at Various Current Densities A cell, constructed in the manner of Example 5, was assembled and cycled at various current densities between 2.5 V and 3.9 V. The discharge capacity of the graphite/$Li_xNi_{0.8}Co_{0.2}O_2$ cell versus cycle number at various discharge/charge current densities is shown in FIG. 6. The figure shows that a cell using 1 m $LiPF_6$/PC-TTFP (1:1 wt ratio) electrolyte can retain its capacity after many cycles at various current densities.

EXAMPLE 7

Figure 7:
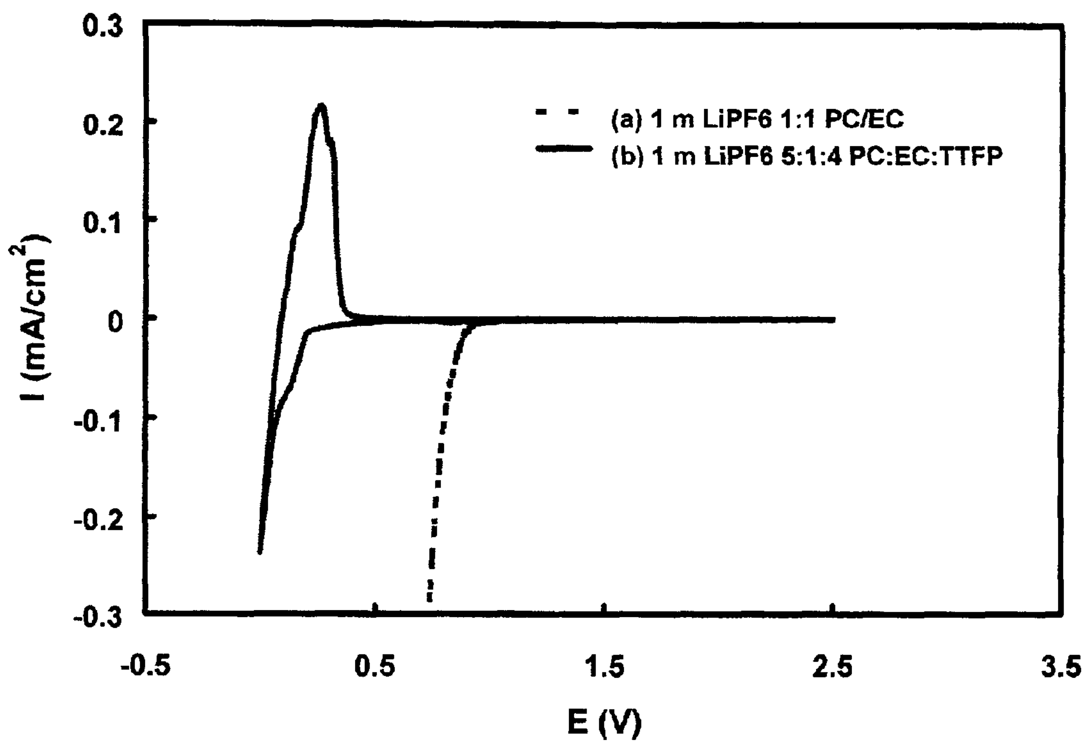
FIG. 7 is cyclic voltammograms of graphite electrode in 1 m $LiPF_6$/PC-EC (1:1 wt ratio) and in 1 M $LiPF_6$/PC-EC-TTFP (5:1:4 wt ratio) electrolytes.

Stability of 1 m $LiPF_6$/PC-EC (1:1 wt Ratio) Electrolyte and 1 M $LiPF_6$/PC-EC-TTFP (5:1:4 wt Ratio) Electrolyte with Respect to Graphite Electrode Two identical Li/graphite cells, each with an electrode area of 6 $cm^2$ were assembled. The first cell was filled with 1 m $LiPF_6$/PC-EC (1:1 wt ratio) electrolyte and the second cell was filled with 1 m $LiPF_6$/PC-EC-TTFP (5:1:4 wt ratio) electrolyte. The stability of the electrolyte was tested using a cyclic voltammetry technique at a scanning rate of 0.01 mV/s between 2.5 V and 0 V. Cyclic voltammograms of these two cells are shown in FIG. 7. When the potential was scanned down to 0.8 V vs. $Li^+$/Li, a sharp increase in the cathodic current appeared using 1 m $LiPF_6$/PC-EC electrolyte. This indicates that Li ions cannot intercalate into the graphite electrode when this particular electrolyte is used. Whereas cyclic voltammogram of the second cell, using 1 m $LiPF_6$/PC-EC-TTFP electrolyte, shown as curve (b) of FIG. 7, has a pair of current peaks in the potential range of below 0.5 V. The current peaks for this electrolyte indicate the intercalation/de-intercalation processes of Li ions into and out of graphite. This example demonstrates that, by replacing part of EC with TTFP in the electrolyte solvents, Li ions can intercalate into and de-intercalate out of graphite electrode.

EXAMPLE 8

Figure 8:
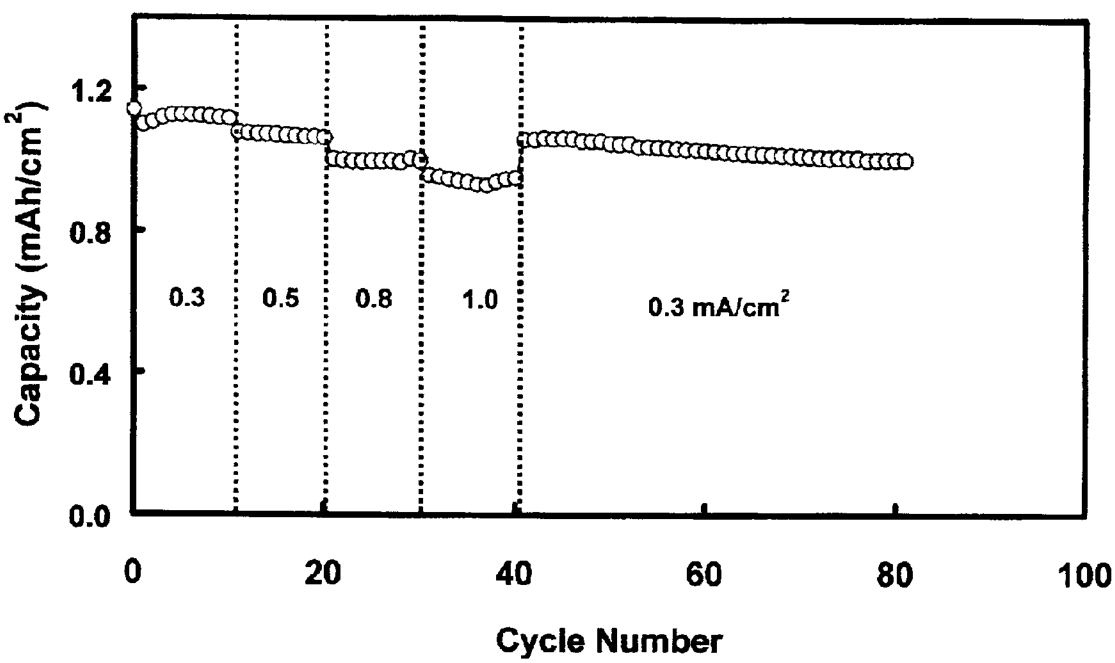
FIG. 8 is a graph showing cell performance in 1 M $LiPF_6$/PC-EC (1:1) electrolyte and in 1 M $LiPF_6$/PC-EC-TTFP (5:1:4) electrolyte.

Performance of Graphite/$Li_xNi_{0.8}Co_{0.2}O_2$ Cell in 1 m $LiPF_6$/PC-EC-TTFP (5:1:4) Electrolyte A cell, constructed in the manner of Example 5 but filled with 1 m $LiPF_6$/PC-EC-TTFP (5:1:4 wt ratio) electrolyte, was assembled and cycled at various current densities between 2.5 V and 3.9 V. The current density for the first cycle was 0.1 $mA/cm^2$, and the current densities for the subsequent cycles are shown in FIG. 8. The discharge capacity of the cell as a function of cycle number is plotted and shown in FIG. 8. This example shows that the cell with graphite anode can cycle well using electrolyte containing a mixture of PC, EC, and TTFP as the solvent.

EXAMPLE 9

Figure 9:
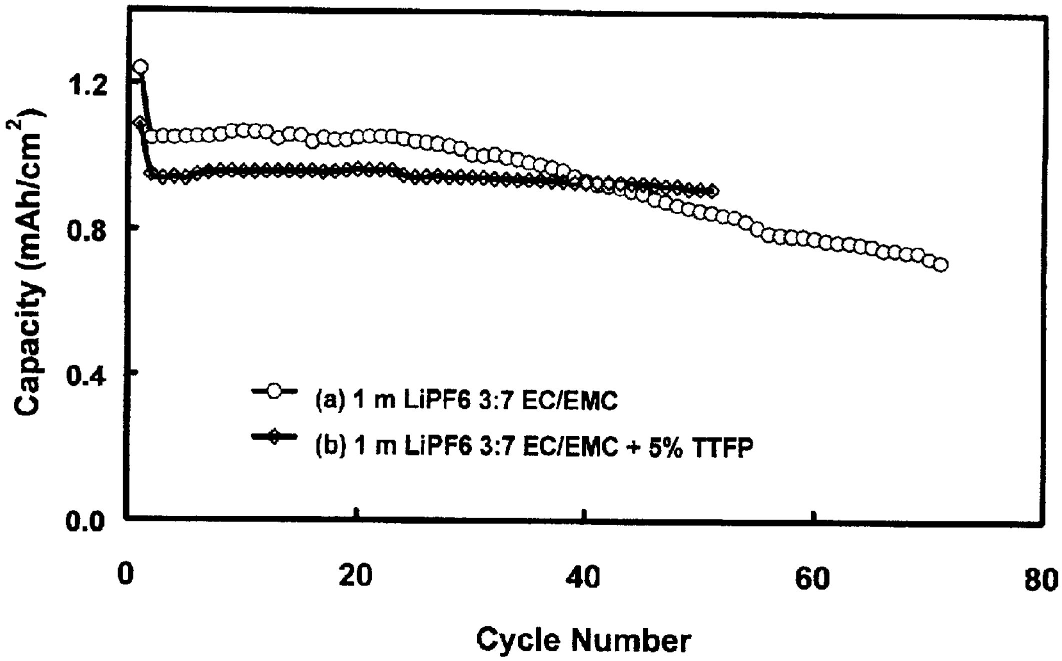
FIG. 9 is a graph showing cell performance in 1 M $LiPF_6$/EC-EMC with and without TTFP.

Performance of Cells Using Electrolytes of 1 m $LiPF_6$/EC-EMC with and without TTFP Two graphite/$Li_xNi_{0.8}Co_{0.2}O_2$ cells with an electrode area of 25 $cm^2$ were assembled. The first cell included 1 m $LiPF_6$/EC-EMC (3:7 wt ratio) electrolyte, and the second cell used the same electrolyte with 5 wt % of TTFP added. Both cells were carried out a charge-discharge between 2.5 V and 3.9 V. The current density of the first cycle was 0.093 $mA/cm^2$, and the current density of the subsequent cycles was 0.3 $mA/cm^2$. The discharge capacities of both graphite/$Li_xNi_{0.8}Co_{0.2}O_2$ cells as a function of cycle number are shown in FIG. 9. The figure shows that the cell with the electrolyte containing TTFP can retain the capacity better than the cell with the electrolyte containing no TTFP.

EXAMPLE 10

Figure 10:
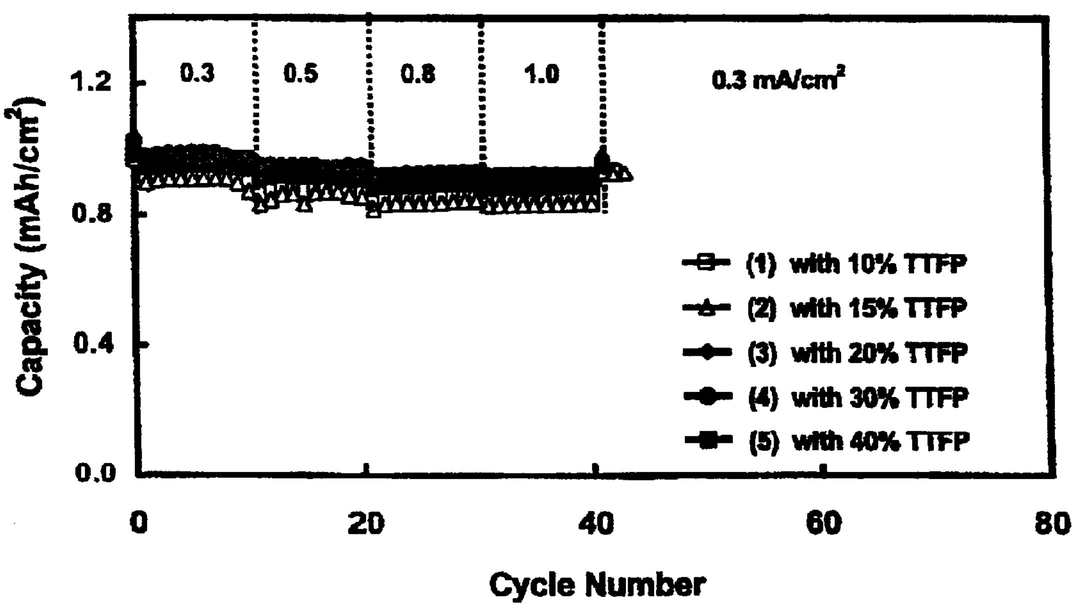
FIG. 10 is a graph showing cell performance in 1 M $LiPF_6$EC-EMC electrolyte with different amount of TTFP.

Performance of Cells Using 1 m $LiPF_6$/EC-EMC Electrolyte with Different Weight Percent of TTFP Six electrolyte solvents with different weight percentages of TTFP were prepared by adding 5, 10, 15, 20, 30, and 40 weight percent of TTFP into a EC-EMC (3:7 wt ratio) ternary solvent mixture, respectively. Then, dissolving 1 m $LiPF_6$ into the resulted electrolyte solvents made six electrolyte solutions containing different TTFP contents. Six cells of the same size and the same electrode materials were assembled as described in Example 5 and filled with the six electrolyte solutions obtained above, respectively. All cells were cycled between 2.5 V and 3.9 V at a constant current density. The current density for the first cycle was 0.093 $mA/cm^2$, and the current densities for the subsequent cycles varied from 0.093 to 1.0 $mA/cm^2$. The discharge capacity as a function of cycle number is shown in FIG. 10. For comparison, discharge capacity of the cell employing 1 m $LiPF_6$/EC-EMC (3:7 wt ratio) electrolyte was also plotted in FIG. 10. The results show that over extended cycles, the cells containing TTFP have better capacity retention than those cells containing no TTFP.

EXAMPLE 11

Figure 11:
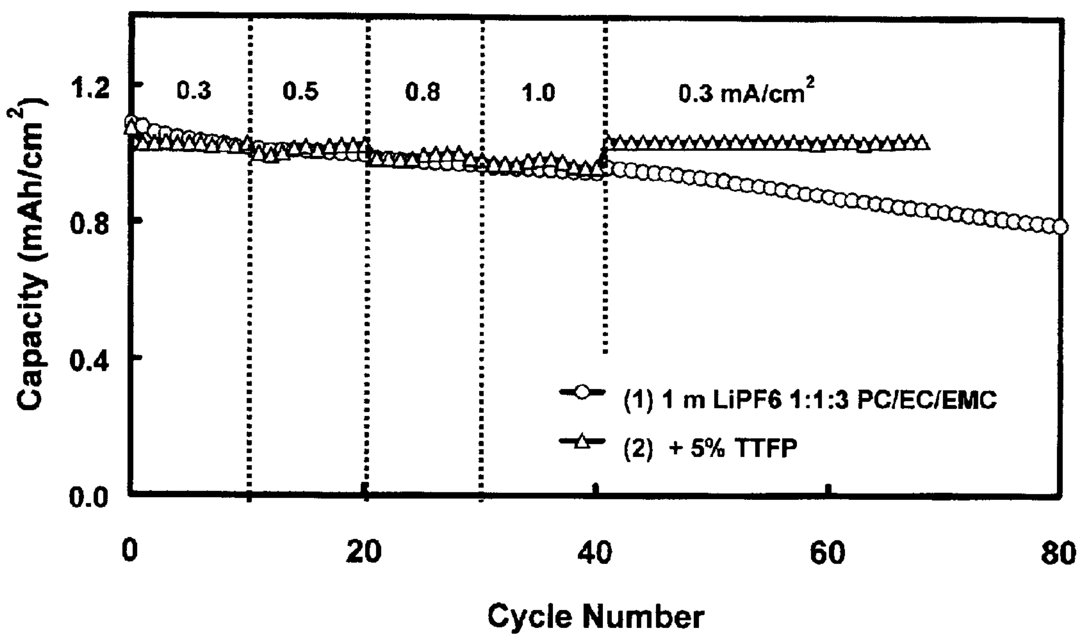
FIG. 11 is a graph showing cell performance of 1 m $LiPF_6$/PC-EC-EMC (1:1:3 wt ratio) electrolyte with and without TTFP.

Performance Cells Using 1 m $LiPF_6$/PC-EC-EMC (1:1:3 wt Ratio) Electrolyte with and without TTFP Two graphite/$Li_xNi_{0.8}Co_{0.2}O_2$ cells were assembled in the manner described in Example 5. The first cell used 1 m $LiPF_6$/PC-EC-EMC (1:1:3 wt ratio) electrolyte and the second cell used the same electrolyte with 5 wt % of TTFP added thereto. Both cells were carried out a charge-discharge test on between 2.5 V and 3.9 V. The current density for the first cycle was 0.093 mA/cm$^2$, while the current densities for the subsequent cycles are shown in FIG. 11. As indicated in FIG. 11, the two cells exhibit a similar capacity during the initial cycles. However, the cell containing 5% of TTFP shows better capacity retention under extended cycling, and recovers to a higher capacity when the discharge current density changes from 1.0 mA/cm$^2$ to 0.3 mA/cm$^2$.

EXAMPLE 12

Figure 12:
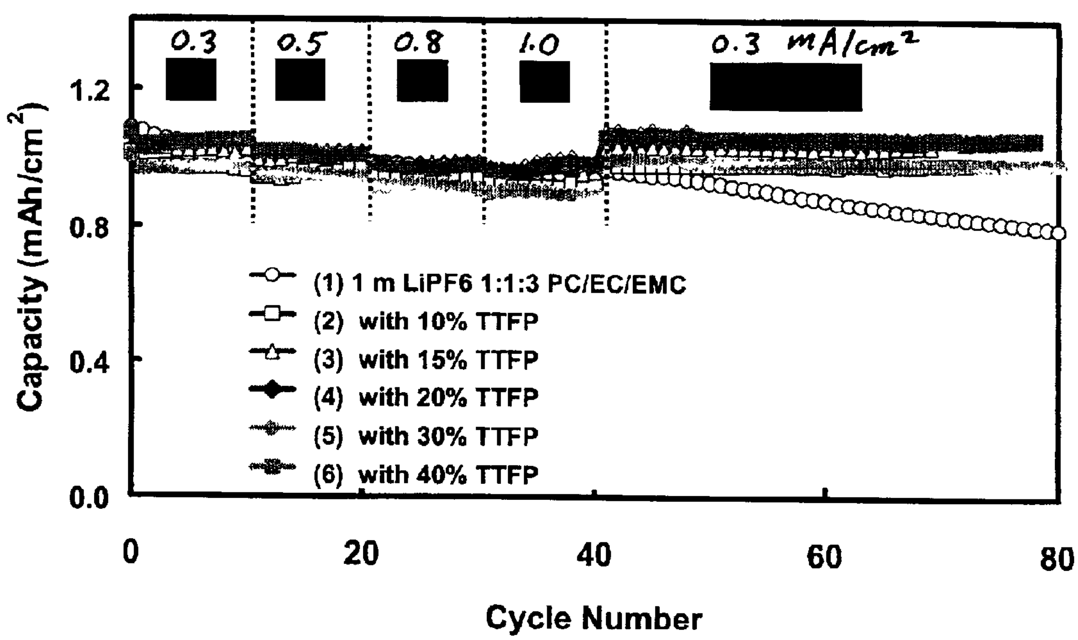
FIG. 12 is a graph showing cell performances of 1 m $LiPF_6$/PC-EC-EMC (1:1:3 wt ratio) with different amount of TTFP.

Performances of Cells Using Electrolytes of 1 m $LiPF_6$/PC-EC-EMC (1:1:3 wt Ratio) with Different Amounts of TTFP Five electrolyte solvents were prepared by adding 10, 15, 20, 30, and 40 wt % TTFP, respectively, to a PC-EC-EMC ternary solvent mixture of 1:1:3 wt ratios. Five electrolyte solutions were then prepared by dissolving 1 m $LiPF_6$ into the above five electrolyte solvent mixtures. Five cells of the same size and the same anode and cathode as described in Example 11 were assembled and filled with, respectively, the five electrolyte solutions as described. All five cells were cycled between 2.5 V and 3.9 V at a constant current density. Current density for the first cycle was 0.093 mA/cm$^2$, and the current densities for the subsequent cycles are shown in FIG. 12. For comparison, discharge capacity of the cell employing 1 m $LiPF_6$/PC-EC-EMC (1:1:3 wt ratio) electrolyte was also plotted in FIG. 12. As shown in FIG. 12, all cells have the similar discharge capacity at various current rates during the initial cycles. However, the cells containing TTFP show better capacity retention under extended cycling, and recover to higher capacity when the current changes from a high cycling rate (1.0 mA/cm$^2$) to lower rate (0.3 mA/cm$^2$). FIG. 12 also indicates that the discharge capacity was impacted little by the TTFP content ranging from 10 to 40 wt %.

EXAMPLE 13

Effect of TTFP on the Storage Stability of 1 m $LiPF_6$/PC-EMC (3:7 wt Ratio) Electrolyte in a Glass Vial 1 mL of 1 m $LiPF_6$/PC-EMC (3:7 wt ratio) electrolyte and 1 mL of the same electrolyte with 5 wt % of TTFP were stored in two separate borosilicate glass vials sealed with a Wheaton Snap-On stoppers and an aluminum seal. Both vials were stored at room temperature for 9 months. The electrolyte of 1 m $LiPF_6$/PC-EMC became brown and yielded particulates in the bottom of the vial, whereas the vial with 5% of TTFP remained freshly clear (colorless) after 9 months of storage.

EXAMPLE 14

Flame Test of the 1 m $LiPF_6$/PC-EMC (3:7 wt Ratio) Electrolyte with and Without TTFP Two glass-fibers were soaked with 1 m $LiPF_6$/PC-EMC (3:7 wt ratio) electrolyte and the same electrolyte with 15 wt % of TTFP, respectively. These two fibers were then placed under a burning lighter. The glass-fiber soaked with the 1 m $LiPF_6$/PC-EMC (3:7 wt ratio) electrolyte was immediately caught fire and burned away, while the one containing 15% of TTFP did not burn at all.

Although described with reference to preferred embodiments, it should readily understood that various changes and/or modifications could be made to the invention without departing from the spirit thereof. In any event, the invention is only intended to be limited by the scope of the following claims.

We claim:

1. A non-aqueous electrolyte solution comprising:

a lithium salt and a solvent including at least one alkyl phosphite of the following Formula,

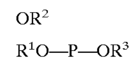

wherein $R^1$, $R^2$ and $R^3$ may be the same or different, each being selected from the group consisting of straight or branched alkyl groups; and wherein at least one of said alkyl groups are substituted by at least one halogen atom.

2. The non-aqueous solution of claim 1, wherein said at least one of said at least one halogen atom is fluorine.

3. The non-aqueous solution of claim 2, wherein said alkyl group is selected from the group consisting of difluoromethyl; monofluoromethyl; trifluoromethyl; 2,2-difluoroethyl; 2-fluoroethyl; 2,2,2-trifluoroethyl; 3,3,2,2-tetrafluoroethyl; 3,3,3,2,2-pentafluoroethyl; 2,3,3-trifluoropropyl, 3,3,3,2,2-pentafluoropropyl; 1,1,3,3-tetrafluoro-2-propyl; 1,1,1,3,3,3-hexafluoro-2-propyl; 2,2,3,3,4,4,4-heptafluorobutyl; and perfluoro-t-butyl groups.

4. The non-aqueous solution of claim 2, wherein said alkyl phosphite is a fluoroalkyl phosphite selected from the group consisting of tris(2,2,2-trifluoroethyl phosphite), bis(2,2,2-trifluoroethyl)methyl phosphite, 2,2,2-trifluoroethyldimethyl phosphite, tris(monofluoromethyl) phosphite, tris(2,2-difluoroehtyl) phosphite, and tris(3,2,2-trifluoropropyl) phosphite.

5. A non-aqueous electrolyte solution comprising:

a lithium salt and a solvent including at least one alkyl phosphite of the following Formula,

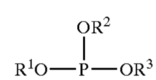

wherein $R^1$, $R^2$ and $R^3$ may be the same or different, each being independently selected from the group consisting of methyl, ethyl, n-propyl, isopropyl, n-butyl, sec-butyl, t-butyl and isobutyl groups.

6. The non-aqueous solution of claim 1, wherein said solvent additionally includes at least one carbonate.

7. The non-aqueous solution of claim 6, wherein said carbonate is selected from the group consisting of ethylene carbonate, propylene carbonate, diethyl carbonate, dimethyl carbonate, ethylmethyl carbonate, dimethyl carbonate, butylene carbonate, vinylene carbonate, methylpropyl carbonate, methylbutyl carbonate, and ethylbutyl carbonate.

8. The non-aqueous solution of claim 6, wherein said solvent includes at least one linear carbonate and at least one cyclic carbonate.

9. The non-aqueous solution of claim 8, wherein said cyclic carbonate is 10–90% wt and said linear carbonate is 10–90% wt of said solvent.

10. The non-aqueous solution of claim 1, wherein said lithium salt is selected from the group consisting of $LiPF_6$, $LiBF_4$, $LiAsF_6$, $LiClO_4$, $LiCF_3SO_3$, $LiN(CF_3SO_2)_2$ and $LiAlCl_4$.

11. The non-aqueous solution of claim 9, wherein said lithium salt is $LiPF_6$.

12. The non-aqueous solution of claim 1, wherein said lithium salt concentration is from 0.1–3 mol/L.

13. The non-aqueous solution of claim 1, wherein said lithium salt concentration is from 0.5–2 mol/L.

14. The non-aqueous solution of claim 1, wherein said alkyl phosphite is 1–50% wt of said solvent.

15. The non-aqueous solution of claim 12, wherein said alkyl phosphite is 15–30% wt of said solvent.

16. The non-aqueous solution of claim 1, wherein said solution additionally includes at least one additive, selected from the group consisting of gelling agents, polymers and ionically conductive polymers.

17. An electrochemical energy storage device comprising:

a negative electrode;

a positive electrode;

a separator therebetween; and the non-aqueous electrolyte solution of claim 1.

18. The electrochemical energy storage device of claim 17, wherein said negative electrode includes a lithium metal or alloy thereof and carbonaceous materials capable of being intercalcated and de-intercalcated with lithium ions.

19. The electrochemical energy storage device of claim 18, wherein said carbonaceous materials are selected from the group consisting of graphite, amorphous carbon, activated carbon, carbon fibers, carbon black and mesocarbon microfibers.

20. The electrochemical energy storage device of claim 18, wherein said positive electrode includes a component selected from the group consisting of transition metal oxides, transition metal sulfides, conducting polymers, compounds capable of being reversibly polymerized and depolymerized by electrolysis and complexed oxides of lithium and transition metals.

21. The electrochemical storage device of claim 19, wherein said component of said positive electrode is selected from the group consisting of $MnO_2$, $V_2O_5$, $MoS_2$, $TiS_2$, polyaniline, polypyrrole, disulfide compounds, $LiCoCO_2$, $LiMnO_2$, $LiMn_2O_4$ and $LiNiO_2$.

22. The electrochemical storage device of claim 19, wherein said storage device is a cell having a shape selected from the group consisting of a cylinder, a rectangular prism, a coin and a card.

23. An electrochemical energy storage device comprising:

a negative electrode, including lithium metal or alloy thereof and carbonaceous materials capable of being intercalcated and de-intercalcated with lithium ions;

a positive electrode, selected from the group consisting of transition metal oxides, transition metal sulfides, conducting polymers, compounds capable of being reversibly polymerized and depolymerized by electrolysis and complexed oxides of lithium and transition metals;

a separator therebetween; and a non-aqueous electrolyte comprising:

a lithium salt, selected from the group consisting of $LiPF_6$, $LiBF_4$, $LiAsF_6$, $LiClO_4$, $LiCF_3SO_3$, $LiN(CF_3SO_2)_2$ and $LiAlCl_4$, and a solvent comprising:

at least one carbonate selected from the group consisting of linear carbonates and cyclic carbonates; and at least one alkyl phosphite of the following Formula,

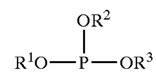

wherein $R^1$, $R^2$ and $R^3$ may be the same or different, each being selected from the group consisting of straight or branched alkyl groups, wherein at least one of $R^1$, $R^2$ and $R^3$ is substituted by at least one halogen atom, and said alkyl phosphite is 1–50% wt of said solvent.

24. An electrochemical energy storage device comprising:

a negative electrode;

a positive electrode;

a separator therebetween; and a non-aqueous electrolyte comprising:

a lithium salt and a solvent including at least one alkyl phosphite of the following Formula,

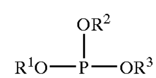

wherein $R^1$, $R^2$ and $R^3$ may be the same or different, are straight or branched alkyl groups of carbon numbers between 1 and 4 carbon atoms, and wherein at least one of said alkyl groups is substituted with at least one halogen atoms.

* * * * *